(12) United States Patent
Hirose

(10) Patent No.: US 10,306,089 B2
(45) Date of Patent: May 28, 2019

(54) IMAGE PROCESSING SYSTEM FOR RETRANSMITTING IMAGE DATA BASED ON DETECTION OF ABNORMALITY OF RECEPTION TIMING OF A HORIZONTAL SYNCHRONIZATION SIGNAL

(71) Applicant: CANON KABUSHIKI KAISHA, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/806,907

(22) Filed: Nov. 8, 2017

(65) Prior Publication Data

US 2018/0131829 A1 May 10, 2018

(30) Foreign Application Priority Data

Nov. 10, 2016 (JP) ................................ 2016-219557

(51) Int. Cl.
*H04N 1/00* (2006.01)
*H04N 1/21* (2006.01)

(52) U.S. Cl.
CPC ..... *H04N 1/00803* (2013.01); *H04N 1/00824* (2013.01); *H04N 1/00931* (2013.01); *H04N 1/2104* (2013.01); *H04N 2201/0094* (2013.01)

(58) Field of Classification Search
CPC .......................... H04N 1/2104; H04N 1/00931
See application file for complete search history.

(56) References Cited

U.S. PATENT DOCUMENTS

| 2010/0090992 | A1* | 4/2010 | Lee | ...................... | G09G 3/3688 345/204 |
| 2010/0194666 | A1* | 8/2010 | Lindner | ................ | G06F 3/1431 345/1.1 |
| 2013/0222828 | A1* | 8/2013 | Shimatani | ............ | H04N 1/0473 358/1.13 |
| 2015/0293712 | A1* | 10/2015 | Li | .......................... | G06F 17/30 711/162 |

FOREIGN PATENT DOCUMENTS

JP           2013-162343 A        8/2013

* cited by examiner

*Primary Examiner* — Benjamin O Dulaney
(74) *Attorney, Agent, or Firm* — Canon U.S.A., Inc. IP Division

(57) ABSTRACT

The image processing system includes a reading unit configured to read an image of a document for each line to generate image data, a generation unit configured to generate a horizontal synchronization signal, the horizontal synchronization signal indicating a pixel at an initial position in each line of the image data that is generated through the reading of the image, a transmitting unit configured to transmit the image data through the reading of the document, and the horizontal synchronization signal, a receiving unit configured to receive the image data and the horizontal synchronization signal transmitted from the transmitting unit, and a requesting unit configured to request retransmission of the image data under transmission from the transmitting unit when the receiving unit receives an horizontal synchronization signal which is different from normal, wherein the transmitting unit transmits the image data in response to the request by the requesting unit.

11 Claims, 6 Drawing Sheets

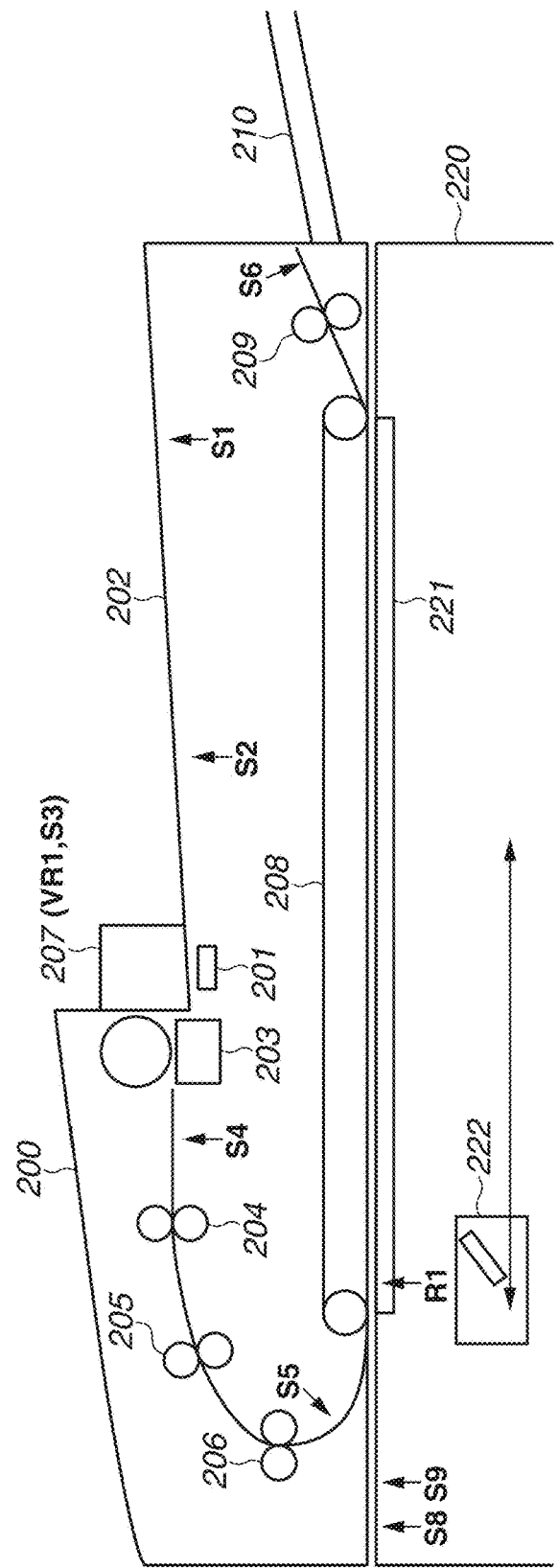

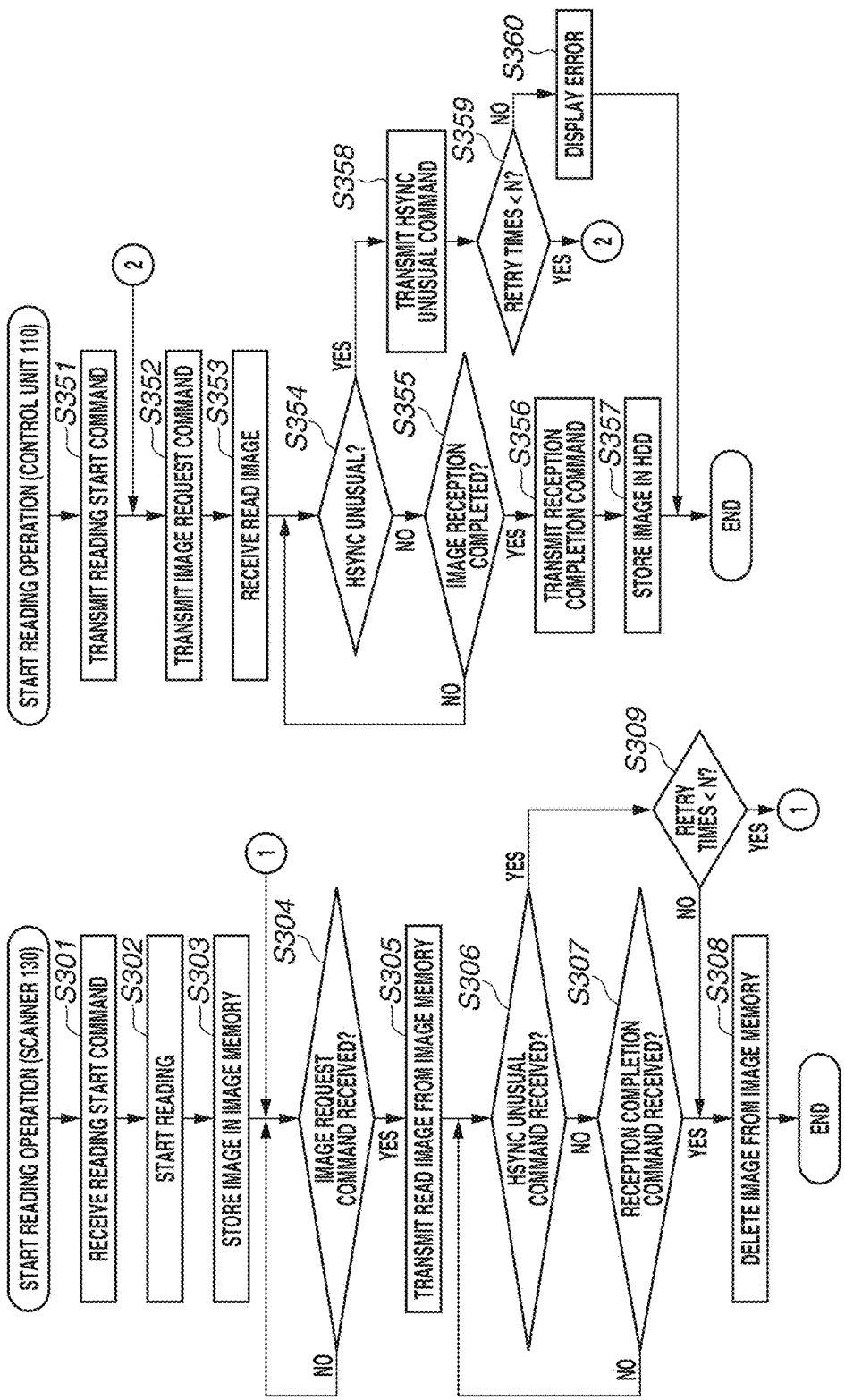

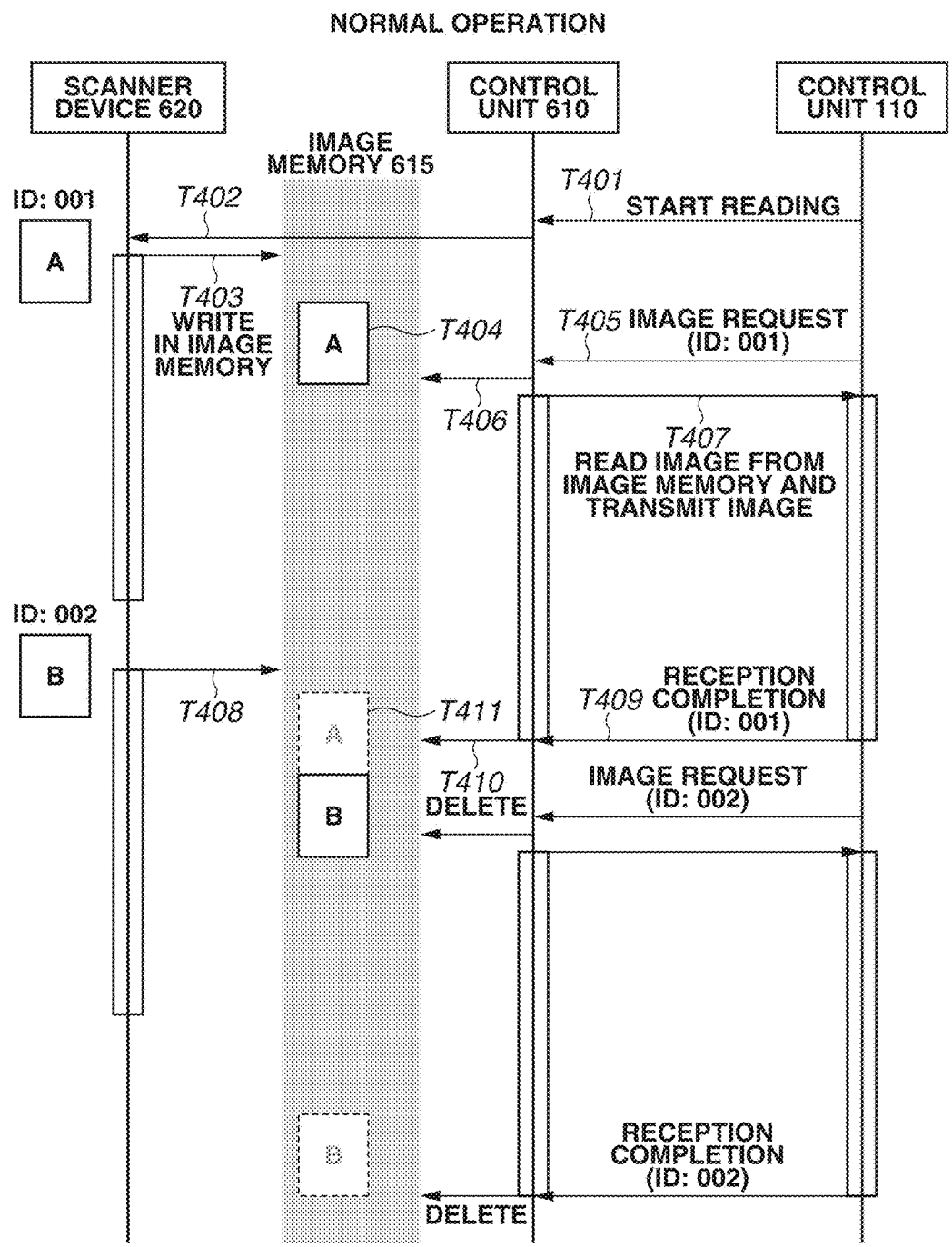

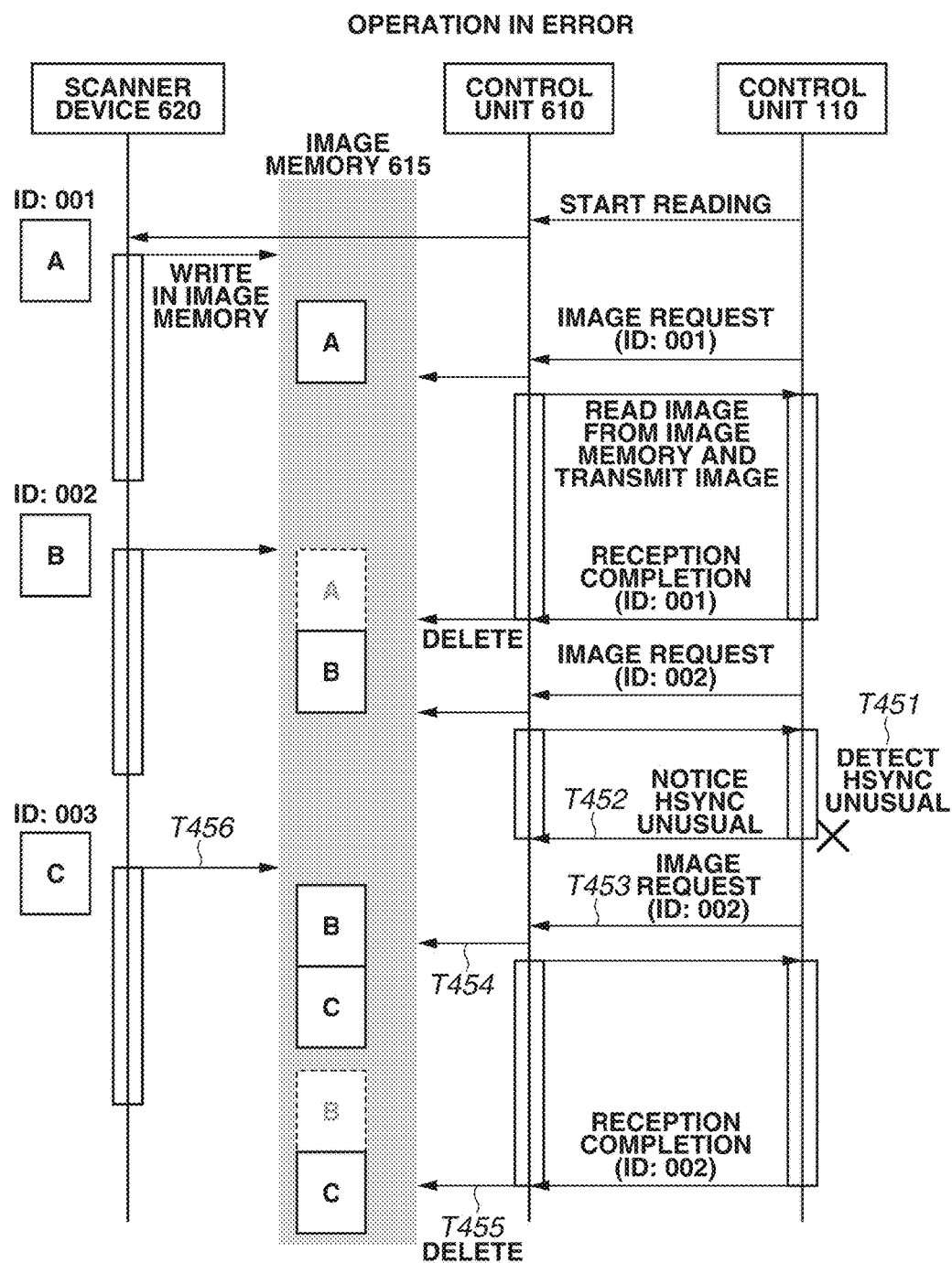

IMAGE PROCESSING SYSTEM FOR RETRANSMITTING IMAGE DATA BASED ON DETECTION OF ABNORMALITY OF RECEPTION TIMING OF A HORIZONTAL SYNCHRONIZATION SIGNAL

BACKGROUND OF THE INVENTION

Field of the Invention

The present invention relates to an image processing system, a document reader, an information processing apparatus, a method of controlling the image processing system, and a storage medium.

Description of the Related Art

When a document reader reads a document image, an unusual image signal acquired by noise may occur. Therefore, Japanese Patent Application Laid-Open No. 2013-162343 discusses a document reader that monitors an image signal, and determines an error and instructs performing of reading operation again when an unusual signal occurs on the image signal.

It is, however, necessary to instruct performing of the reading operation again by a user in order to perform the reading operation again, which is troublesome for the user.

In addition, in scanning by an auto document feeder (ADF), when an unusual signal is detected in the document reading, documents including documents that have been successfully read are conveyed again, which results in useless processing.

SUMMARY OF THE INVENTION

The image processing system disclosed in the present specification is made to solve the above-described issues. The image processing system disclosed in the present specification is directed to providing a mechanism that makes it possible to automatically perform processing of reading next page by a reading unit and processing of receiving again image data of a page on which an error has occurred, from the reading unit even when an unusual signal occurs on a control signal to receive the image data from the reading unit.

An image processing system disclosed in the present specification achieving the above-described object includes the following configuration.

According to embodiments of the present invention, the image processing system includes a reading unit configured to read an image of a document for each line to generate image data, a generation unit configured to generate a horizontal synchronization signal that indicates a pixel at an initial position in each line of the image data generated by the reading unit through the reading of the image, a transmitting unit configured to transmit the image data generated by the reading unit through the reading of the document, and the horizontal synchronization signal generated by the generation unit, a receiving unit configured to receive the image data and the horizontal synchronization signal transmitted from the transmitting unit, and a requesting unit configured to request retransmission of the image data under transmission from the transmitting unit when the receiving unit receives a horizontal synchronization signal which is different from normal, in which the transmitting unit transmits the image data in response to the request by the requesting unit.

Further features of the present invention will become apparent from the following description of exemplary embodiments with reference to the attached drawings.

BRIEF DESCRIPTION OF THE DRAWINGS

FIG. 2 is a cross-sectional diagram illustrating a detailed configuration of a scanner.

FIGS. 3A and 3B are flowcharts to explain a method of controlling the image processing system.

FIG. 4A is a diagram illustrating an example of document reading sequence of the image processing system.

FIG. 4B is a diagram illustrating an example of the document reading sequence of the image processing system.

DESCRIPTION OF THE EMBODIMENTS

Next, exemplary embodiments of an image processing system disclosed in the present specification are described with reference to drawings.

<Description of System Configuration>

Figure 1A:
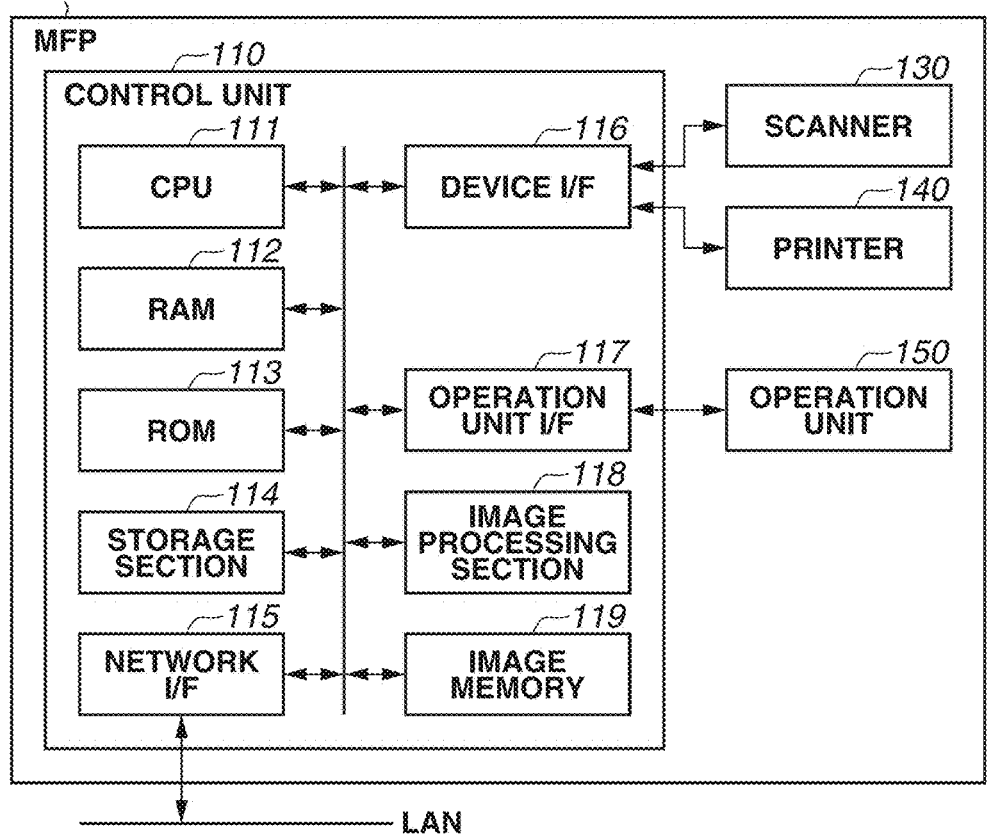
FIGS. 1A and 1B are block diagrams to explain a configuration of an image processing system.
Figure 1B:
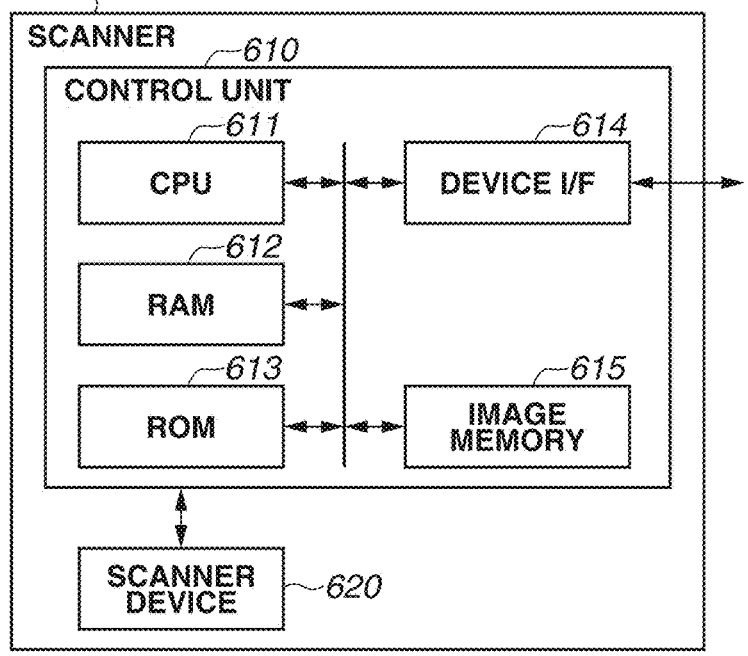

FIGS. 1A and 1B are block diagrams to explain a configuration of the image processing system that includes a document reader according to an exemplary embodiment. In this example, a multifunction printer (MFP) 100 that is a composite machine is described as an example of the image processing system. The MFP 100 includes a scanning function that reads an image of a document, a printing function that outputs print data to a sheet, a copy function that prints the read image on the sheet, a scanning transmission function that transmits data of the read image to a designated destination, and the like. The image processing system may be configured by communicably connecting the MFP 100 serving as an information processing apparatus and a scanner 130 serving as the document reader.

FIG. 1A illustrates a configuration of the MFP 100, and FIG. 1B illustrates a configuration of the scanner 130 that reads a document. In FIG. 1B, a configuration of an auto document feeder (ADF) that feeds a document is omitted, and the configuration of the ADF is described in FIG. 2.

In FIG. 1A, a control unit 110 serving as a first controller is connected to the scanner 130 serving as an image input device and a printer 140 serving as an image output device, and controls input/output of image information.

In addition, the control unit 110 is connected to local area network (LAN), and for example, receives a printing job through the LAN. A central processing unit (CPU) 111 controls operation of the MFP 100, and operates based on programs stored in a random access memory (RAM) 112. A read only memory (ROM) 113 is a boot ROM and holds a boot program of the system. A storage section 114 holds system software, image data, a program to control the operation of the MFP 100, and the like. The CPU 111 controls the operation of the MFP 100 based on the program that is loaded into the RAM 112 from the storage section 114.

A network interface (I/F) 115 is connected to the LAN and performs input/output of various kinds of information through the network. A device I/F 116 connects the control unit 110 to the scanner 130 and the printer 140 that are the image input/output devices, and performs synchronous/asynchronous conversion of image data. An operation unit I/F 117 is an interface that connects an operation unit 150 and the control unit 110, and outputs, to the operation unit 150, image data to be displayed on the operation unit 150.

Further, the operation unit I/F 117 transmits, to the CPU 111, information input by a user through the operation unit

150. An image processing section 118 performs image processing on print data received through the LAN, or performs image processing on image data input/output through the device I/F 116. Unusual image signals in the image processing system disclosed in the present specification are monitored by the image processing section 118. An image memory 119 is a memory that temporarily loads the image data processed by the image processing section 118.

FIG. 1B is a block diagram of the scanner 130 illustrated in FIG. 1A.

In FIG. 1B, the scanner 130 includes a control unit 610 serving as a second controller, and a scanner device 620. A CPU 611 controls operation of the scanner 130, and operates based on programs that are stored in a ROM 613 and loaded into a RAM 612. A device I/F 614 is connected to the control unit 110 and performs synchronous/asynchronous conversion of image data. An image memory 615 is a memory that temporarily loads image data provided from the scanner device 620. In the present exemplary embodiment, the image memory 615 has a capacity sufficient to hold image data for two pages with maximum readable size. In addition, the storage capacity of the image memory 615 is varied depending on reading resolution.

The control unit 610 transmits, to the control unit 110, the image data stored in the image memory 615, based on an image transfer command received through the device I/F 614. As for the unusual image signals in the present exemplary embodiment, document reading and retransmission processing of read image data are described in detail while describing a horizontal synchronization signal (HSYNC) and a vertical synchronization signal (VSYNC) as examples of an image signal generated between the device I/F 614 and the device I/F 116. The horizontal synchronization signal (HSYNC) and the vertical synchronization signal (VSYNC) are reading control signals that are provided to the control unit 110 from the control unit 610, as discussed in Japanese Patent Application Laid-Open No. 2013-162343. In other words, the control unit 110 receives the image data that is transmitted from the control unit 610 according to the horizontal synchronization signal (HSYNC) or the vertical synchronization signal (VSYNC). For example, the horizontal synchronization signal (HSYNC) is a signal indicating a pixel at an initial position in each line of the image data. The CPU 611 of the scanner 130 generates the horizontal synchronization signal (HSYNC), and transmits the horizontal synchronization signal (HSYNC) to the control unit 110 through the device I/F 116.

Therefore, if an interval of the horizontal synchronization signals (HSYNC) that should be generated with equal intervals is shifted in the control unit 610, the image data received by the control unit 110 is accordingly read as unusual image data as illustrated in FIG. 6B of Japanese Patent Application Laid-Open No. 2013-162343.

FIG. 2 is a cross-sectional diagram illustrating a detailed configuration of the scanner 130 illustrated in FIG. 1. In this example, a document tray 202 serving as a document loading unit is provided, and documents are loaded on a surface of the document tray 202.

In FIG. 2, in a document feeder of a document conveying apparatus 200, an unillustrated delivery roller serving as a delivery unit takes a bundle of documents loaded on the document tray 202 into a separation unit 203, the separation unit 203 separates the uppermost document of the bundle of documents one by one, and conveys the document to conveyance rollers 204 and 205. A registration roller 206 is stopped when a leading edge of the document arrives. The registration roller 206 forms a loop by conveyance of the conveyance rollers 204 and 205 to perform skew correction, and the registration roller 206 then conveys the document to a document reading unit. In the document reading unit of the document conveying apparatus 200, the document conveyed from the above-described document feeder is conveyed to a position R1 at a predetermined speed by the registration roller 206 and a reading belt 208.

When the leading edge of the document arrives at the reading position R1, exposure operation is performed by an optical unit 222 fixed at the reading position R1, which allows for reading operation while conveying the document.

In contrast, when a trailing edge of the document arrives at the reading position R1, the document is stopped, and the optical unit 222 performs scanning while performing exposure, which allows for reading operation by the moving optical unit 222. This reading method is referred to as a fixed reading mode.

When the reading of the document is completed according to the above-described processes, the document is conveyed to a document discharging unit by the reading belt 208. In the document discharging unit, the document is discharged to a discharge tray 210 by a discharge roller 209.

In FIG. 2, various kinds of sensors S1 to S6 and VR1 are disposed inside the document conveying apparatus 200.

A large-size detection sensor S1, a small-size detection sensor S2, a width detection volume VR1, and a width detection sensor S3 are disposed on the document tray 202. The large-size detection sensor S1 and the small-size detection sensor S2 detect a length of the document. The width detection volume VR1 and the width detection sensor S3 are provided inside a document width guide 207. Further, a size sensor S4, a read sensor S5, and a discharge sensor S6 are disposed in the document conveying apparatus 200. The size sensor S4 detects the leading edge and the trailing edge of the document to detect the separately-fed document as well as to measure the length of the document. The read sensor S5 detects the leading edge of the document to provide a reading signal.

In addition, an unillustrated document set sensor S7 that determines whether a document has been set on the document tray 202 is provided in the document conveying apparatus 200. Open/close detection sensors S8 and S9 that detect an open/close angle of the document conveying apparatus 200 are disposed inside an image reader 220.

When the document is placed on a platen glass 221 by the user, the image reader 220 specifies the size of the placed document by the open/close detection sensors S8 and S9, an unillustrated size sensor, and the exposure operation. When the document is placed on the platen glass 221 by the user, the optical unit 222 scans the document while performing exposure in a manner similar to the fixed reading method, to perform reading by the moving optical unit 222. This method is a well-known technology, and detailed description thereof is omitted.

FIGS. 3A and 3B are flowcharts to describe a method of controlling the image processing system according to the present exemplary embodiment. FIG. 3A corresponds to reading processing procedure by the scanner 130, and FIG. 3B corresponds to reading control procedure by the control unit 110. In the processing, processes illustrated in FIG. 3A corresponds to the programs that are stored in the ROM 613, loaded into the RAM 612, and executed by the CPU 611.

In FIG. 3A, when the CPU 611 of the scanner 130 receives a reading start command from the control unit 110 in step S301, the CPU 611 of the scanner 130 transmits the reading start command to the scanner device 620 in step S302. Thereafter, the scanner device 620 receives the reading start command and starts reading of the document. In step S303, the CPU 611 stores image data output from the scanner device 620, in the image memory 615.

In step S304, the CPU 611 of the scanner 130 waits for reception of an image request command from the CPU 111 of the control unit 110. At this time, when the CPU 611 of the scanner 130 receives the image request command from the CPU 111 of the control unit 110 (YES in step S304), the processing proceeds to step S305. In step S305, the CPU 611 reads out the image data from the image memory 615, and starts transmission of the image data to the control unit 110 through the device I/F 614.

At this time, the CPU 611 of the scanner 130 determines, in step S306, whether a HSYNC unusual command has been received and determines, in step S307, whether a reception completion command has been received. When the CPU 611 of the scanner 130 determines that the HSYNC unusual command has not been received (NO in step S306), Specifically, when the CPU 611 of the scanner 130 determines that the reception completion command has been received from the CPU 111 of the control unit 110 (YES in step S307), the processing proceeds to step S308.

In step S308, the CPU 611 of the scanner 130 deletes the image data stored in the image memory 615 and the processing ends. In step S308, the control unit 110 of the image processing apparatus receives notification of reading completion that is transmitted every time the image data for each document is stored in the image memory 119 serving as a storage unit. In addition, the control unit 110 deletes the image data of the corresponding document stored in the image memory 615.

In contrast, in step S306, when the CPU 611 of the scanner 130 determines that the HSYNC unusual command has been received (YES in step S306), the processing proceeds to step S309. In step S309, the CPU 611 determines whether the number of retry times is lower than a predetermined number N. When the CPU 611 determines that the number of retry times is lower than the predetermined number N (YES in step S309), the processing returns to step S304.

In contrast, when the CPU 611 determines that the number of retry times is equal to or larger than the predetermined number N (NO in step S309), the CPU 611 of the scanner 130 deletes the image data from the image memory 615 and the processing ends.

The storage of all of the image data is not necessarily completed in step S303, and steps S304 and S305 may be executed before completion of the process even in the middle of the process.

The reading processing procedure by the control unit 110 of the MFP 100 is described below with reference to FIG. 3B. Each step is achieved when the CPU 111 loads the corresponding program stored in the ROM 113 into the RAM 112 and executes the program. In step S351, the CPU 111 of the control unit 110 transmits the reading start command to the scanner 130. The command is transmitted to the scanner 130 through the device I/F 116. In step S352, the control unit 110 transmits the image request command to the scanner 130. In step S353, the control unit 110 receives the image data read by the scanner 130.

The read image data is received from the scanner 130 through the device I/F 116, and is sequentially loaded into the image memory 119 through the image processing section 118.

During reception of the read image data, the control unit 110 monitors an HSYNC unusual state in step S354, and monitors an image reception completion state in step S355.

The HSYNC unusual state indicates a state in which an interval of the horizontal synchronization signals HSYNC received with equal intervals is shifted. For example, the state includes a case of receiving a noise signal. The determination in step S354 corresponds to a process of determining whether the HSYNC unusual state is detected.

When it is determined that the unusual HSYNC has not occurred (NO in step S354) and it is determined that the reception of the image data has been completed (YES in step S355), the processing proceeds to step S356. In step S356, the CPU 111 of the control unit 110 transmits the reception completion command to the CPU 611 of the scanner 130. In step S357, the CPU 111 of the control unit 110 stores the image loaded into the image memory 119, in the HDD (the storage section 114), and the reading processing ends.

In contrast, when the CPU 111 of the control unit 110 detects the unusual HSYNC in step S354 (YES in step S354), the CPU 111 of the control unit 110 transmits the HSYNC unusual command to the CPU 611 of the scanner 130 in step S358. At this time, when the CPU 111 determines that the number of retry times is lower than the predetermined number N (YES in step S359), the processing returns to step S352.

In contrast, when the CPU 111 determines that the number of retry times exceeds the predetermined number N (NO in step S359), the CPU 111 of the control unit 110 performs error display on the operation unit 150 and the reading processing ends.

FIG. 4A is a diagram illustrating an example of normal operation sequence of the image reading processing by the scanner device 620, the control unit 610, and the control unit 110. FIG. 4A schematically illustrates the operation when the scanner 130 performs the reading processing on two one-sided documents from the ADF. The processing is described below in association with the corresponding steps in the above-described flowcharts. Timings T401 to T411 are indicated in FIG. 4A.

When the control unit 110 transmits the reading start command to the control unit 610 (timing T401, steps S301 and S351), the control unit 610 causes the scanner device 620 to start the reading processing (timing T402, step S302). The scanner device 620 reads the document, and writes image data of the read document in the image memory 615 (timing T403, step S303). A solid line at timing T404 indicates that the image memory 615 holds the image.

The control unit 110 transmits the image request command of a document ID001 at timing T405 (step S352). The control unit 610 receives the image request command at timing T405 (YES in step S304), and reads out the read image data from the image memory 615 that has the capacity for a plurality of documents at timing T407, and transmits the read image data (step S305).

When the reading of the document ID001 is completed, the scanner device 620 reads next document (ID002) and writes the read image of the document in the image memory 615 (timing T408), sequentially. When the reception of the image is completed (YES in step S355), the control unit 110 transmits the reception completion command at timing T409 (step S356). When the control unit 610 receives, at timing T409, the reception completion command transmitted from the control unit 110 (YES in step S307), the control unit 610 deletes the image of the document ID001 from the image memory 615 (timing T410, step S308). A dotted line at timing T411 indicates that the image has been deleted from the image memory 615. In the deletion, the secured memory area may be released, or the region may be overwritten by specific data.

FIG. 4B is a diagram illustrating a sequence example when an unusual HSYNC is detected during the image reading processing by the scanner device 620, the control unit 610, and the control unit 110. FIG. 4B schematically illustrates operation when the unusual HSYNC is detected during image transmission/reception of a second document, in the reading processing of three one-sided documents from the ADF by the scanner 130. Description of the operation overlapped with the operation in FIG. 4A is omitted. A symbol T indicates timing or a period.

When an usual HSYNC is detected (YES in step S354) while the control unit 110 receives the image data, namely, while the control unit 610 transmits the image data in period T451, the control unit 110 transmits the HSYNC unusual command at timing T452 (step S358). Next, at timing T453, the control unit 110 transmits the image request command of the document ID002 (step S352). At timing T454, the control unit 610 reads out the image data of the document ID002 from the image memory 615 and transmits the image data again (step S305). When the control unit 610 receives the reception completion command of the document ID002, the control unit 610 deletes the image data of the document ID002 from the image memory 615 at timing T455 (step S308). The scanner device 620 continues reading of a subsequent document at timing T456 even while the retry processing is performed between the control unit 610 and the control unit 110.

Although the example of the unusual horizontal synchronization signal (HSYNC) has been described in the present exemplary embodiment, embodiments of the present invention are applicable to an unusual vertical synchronization signal (VSYNC).

According to the present exemplary embodiment, even if an error occurs when the image data of any document received from the reading unit is stored in the storage unit, it is possible to perform, in parallel, processing of reading next document and processing of receiving again the image data from an initial position of the document on which the error has occurred, from the reading unit.

Accordingly, even if an error occurs when the image data of any document received from the reading unit is stored in the storage unit, it is possible to automatically perform retry processing without causing the user to recognize the unusual.

If the image memory 615 of the control unit 610 has no vacancy for reading of the next document during the retry of retransmitting the image data in the processing illustrated in FIG. 3, reading of a subsequent document may not be continued in some cases. In this case, the processing of conveying the document from the ADF and reading the document is suspended until the image memory 615 is released.

At this time, it is not possible for the user to specify a factor of causing a state where conveyance of the document from the ADF is stopped.

Therefore, control of displaying, on the operation unit 150, that the document reading is suspended because of execution of the above-described retry processing may be performed to clearly notify the user of the factor of stopping the ADF.

[Detail of Issues in Existing Reading Control]

Figure 5:
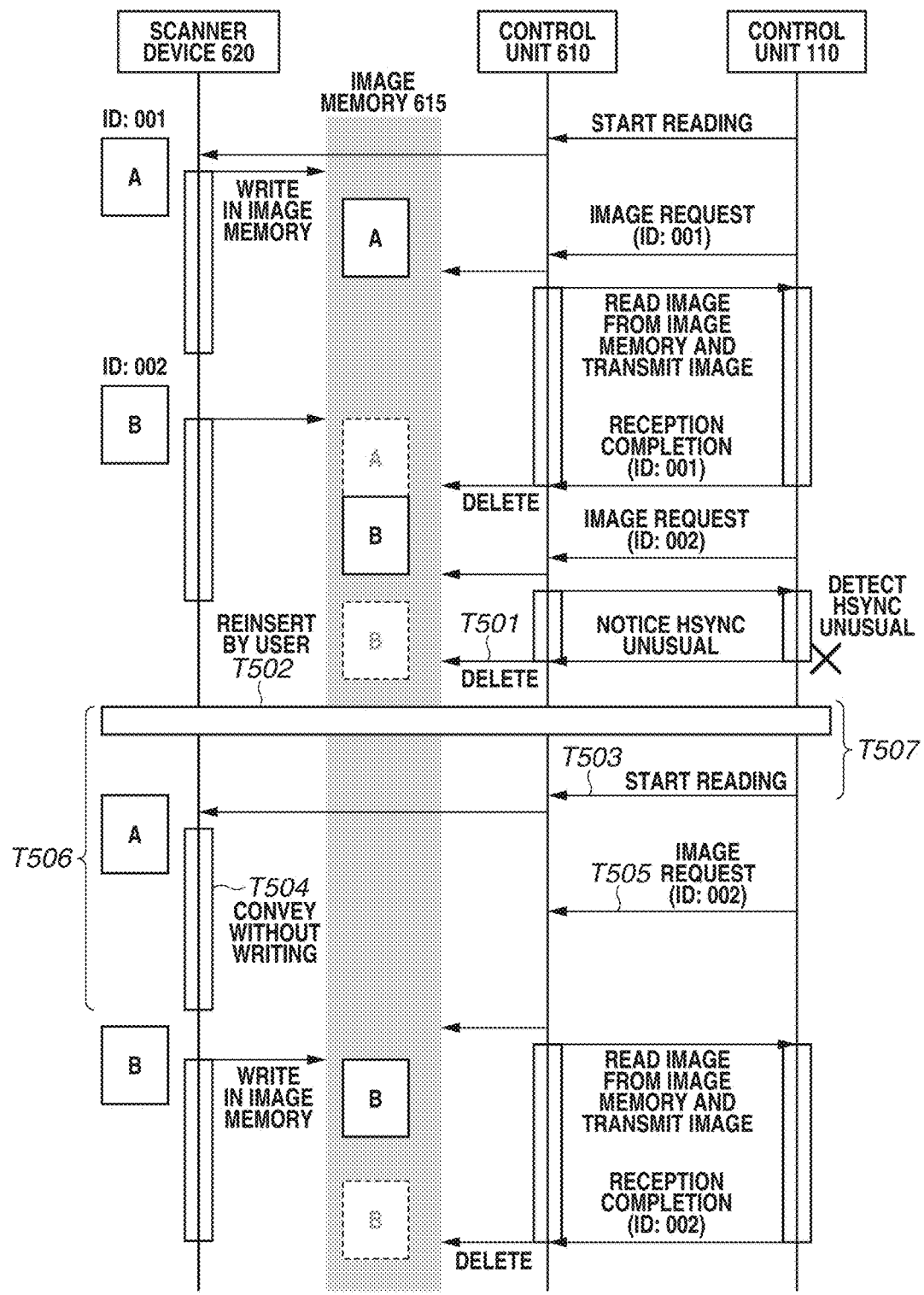
FIG. 5 is a diagram illustrating an example of document reading sequence of an existing image processing system.

FIG. 5 is a diagram illustrating a sequence example when an unusual HSYNC is detected during the image reading processing by the scanner device 620, the control unit 610, and the control unit 110 in an existing technology. A symbol T indicates timing or a period.

FIG. 5 schematically illustrates operation when the unusual HSYNC is detected during image transmission/reception of a second document, in the reading processing of three one-sided documents from the ADF by the scanner 130. Description of the operation overlapped with the operation in FIGS. 4A and 4B is omitted.

When the control unit 110 detects the unusual HSYNC and transmits the HSYNC unusual command to the control unit 610, the control unit 610 deletes the image data from the image memory 615 (timing T501). When the user thereafter performs reinsertion of the documents (period T502), the control unit 110 resumes transmission of the reading start command at timing T503. The reinsertion in period T502 includes resetting of the documents including a document (ID001) that has been successfully read, on the document tray 202 and pressing of a start button (not illustrated) of the operation unit 150.

The scanner device 620 resumes conveyance of the document in response to the reading start command. At this time, with respect to the document (ID001) that has been successfully read, the scanner device 620 only performs conveyance of the document, and does not perform writing in the image memory 615 in period T504. At timing T505, the control unit 110 transmits, to the control unit 610, the image request command of the document (ID002) that has been unsuccessfully read.

As described above, in the existing technology, it is necessary to input the reading processing again by the user in order to perform the reading operation again, which is troublesome for the user. In addition, in the scanning by the ADF, the document that has been successfully read is also conveyed again, which results in a waste process.

In contrast, in the present exemplary embodiment, it is possible to omit a period (T506) for the control unit 610 and the scanner device 620, and a period (T507) for the control unit 110.

The page B (ID002) is deleted according to the unusual HSYNC in the existing technology, whereas the page B is not deleted and reading is performed again without stopping the reading even if the unusual HSYNC occurs in the present exemplary embodiment. Accordingly, it is not necessary for the user to perform resetting of the documents and instruction of the reading processing again.

The image processing system disclosed in the present specification may be realized by supplying a program achieving one or more functions of the above-described exemplary embodiment to a system or an apparatus through a network or a storage medium, and reading and executing the program by one or more processors in a computer of the system or the apparatus. Further, the image processing system disclosed in the present specification is achievable by a circuit (for example, an application specific integrated circuit (ASIC)) that achieves one or more functions.

According to the image processing system disclosed in the present specification, even if an unusual signal occurs on the control signal to receive image data from the reading unit, it is possible to automatically perform processing of reading next document by the reading unit and processing of receiving again the image data of the document on which error has occurred, from the reading unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-219557, filed Nov. 10, 2016, which is hereby incorporated by reference herein in its entirety.

What is claimed is:

1. An image processing system, comprising:
   a reader that reads an image of a document for each line to generate image data;
   a reader controller that has a memory that stores the image data generated by the reader, wherein the reader controller transmits the image data generated by the reader and a horizontal synchronization signal; and
   a controller configured to receive the image data and the horizontal synchronization signal transmitted from the reader controller,
   wherein the controller transmits a request of retransmission of the image data stored in the memory based on detection of abnormality of reception timing of the horizontal synchronization signal transmitted from the reader controller, and
   wherein the reader controller transmits the image data in accordance with the request transmitted by the controller.

2. The image processing system according to claim 1, wherein the reader controller further generates the horizontal synchronization signal.

3. The image processing system according to claim 1, wherein the controller detects the abnormality of reception timing of the horizontal synchronization signal, in accordance with a non-constant interval of the horizontal synchronization signals received by the controller.

4. The image processing system according to claim 1, wherein the controller receives the image data generated by the reader, in a unit of one page.

5. The image processing system according to claim 4,
   wherein the controller interrupts reception of the image data of a page under receiving, in accordance with the request of the retransmission by the controller, and
   wherein the controller requests transmission of the image data from an initial position of the page.

6. The image processing system according to claim 4, wherein the reader controller that deletes, from the memory, the image data that has been completely received by the controller, in accordance with reception completion of the image data for one page by the controller.

7. The image processing system according to claim 6, wherein the memory has a capacity sufficient to hold image data for two pages generated by the reader.

8. The image processing system according to claim 1, wherein the controller notifies a user of a reading error, based on number of request times by the controller.

9. The image processing system according to claim 1, wherein the horizontal synchronization signal is a signal indicating an initial pixel in each line of the image data.

10. A method of controlling an image processing system, the method comprising:
    reading an image of a document for each line to generate image data;
    storing, in a memory, the generated image data;
    transmitting the generated image data and a horizontal synchronization signal;
    receiving the transmitted image data and the transmitted horizontal synchronization signal; and
    transmitting a request of retransmission of the image data stored in the memory based on detection of abnormality of reception timing of the transmitted horizontal synchronization signal,
    wherein the image data to be retransmitted is transmitted in accordance with the transmitted request.

11. A non-transitory computer readable storage medium that holds a computer program causing a computer to execute a method of controlling an image processing system, the method comprising:
    reading an image of a document for each line to generate image data;
    storing, in a memory, the generated image data;
    transmitting the generated image data and a horizontal synchronization signal;
    receiving the transmitted image data and the transmitted horizontal synchronization signal; and
    transmitting a request of retransmission of the image data stored in the memory based on detection of abnormality of reception timing of the transmitted horizontal synchronization signal,
    wherein the image data to be retransmitted is transmitted in accordance with the transmitted request.

* * * * *